United States Patent
Ater et al.

(10) Patent No.: US 12,256,179 B2
(45) Date of Patent: Mar. 18, 2025

(54) COLOR RECONSTRUCTION USING HOMOGENEOUS NEURAL NETWORK

(71) Applicant: SAMSUNG ELECTRONICS CO., LTD., Suwon-si (KR)

(72) Inventors: Yotam Ater, Tel-Aviv (IL); Heejin Choi, Tel-Aviv (IL); Natan Bibelnik, Tel-Aviv (IL); Woo-shik Kim, Tel-Aviv (IL); Evgeny Soloveichik, Tel-Aviv (IL); Ortal Glatt, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 184 days.

(21) Appl. No.: 18/055,098

(22) Filed: Nov. 14, 2022

(65) Prior Publication Data
US 2024/0163410 A1    May 16, 2024

(51) Int. Cl.
| | |
|---|---|
| H04N 9/67 | (2023.01) |
| G06N 3/048 | (2023.01) |
| H04N 9/64 | (2023.01) |
| H04N 23/84 | (2023.01) |
| H04N 25/13 | (2023.01) |
| H04N 25/131 | (2023.01) |

(52) U.S. Cl.
CPC .............. *H04N 9/67* (2013.01); *G06N 3/048* (2023.01); *H04N 9/646* (2013.01); *H04N 23/843* (2023.01); *H04N 25/131* (2023.01); *H04N 25/135* (2023.01)

(58) Field of Classification Search
CPC ........ H04N 9/67; H04N 9/646; H04N 23/843; H04N 25/131; H04N 25/135; G06N 3/048
USPC .......................................................... 348/222.1
See application file for complete search history.

(56) References Cited

U.S. PATENT DOCUMENTS

| | | |
|---|---|---|
| 5,220,618 A | 6/1993 | Sirat et al. |
| 9,036,030 B2 | 5/2015 | Stauder et al. |
| 10,013,811 B2 | 7/2018 | Rajab |
| 10,546,195 B2 | 1/2020 | Lo et al. |
| 10,861,143 B2 | 12/2020 | Kim et al. |
| 11,340,624 B2 * | 5/2022 | Charette ............... G06V 20/584 |

(Continued)

FOREIGN PATENT DOCUMENTS

| | | |
|---|---|---|
| CN | 112862906 A | 5/2021 |
| TW | 201921316 A | 6/2019 |

OTHER PUBLICATIONS

Mayr, et al. "65 Nm CMOS Sensors Applied To Mathematically Exact Colorimetric Reconstruction"; 9 pages; found on the internet: https://arxiv.org/abs/1408.1926.

(Continued)

*Primary Examiner* — Pritham D Prabhakher
(74) *Attorney, Agent, or Firm* — F. CHAU & ASSOCIATES, LLC

(57) ABSTRACT

Systems and methods for image processing, and specifically for color reconstruction of an output signal from a multi-spectral imaging sensor (MIS), are described. Embodiments of the present disclosure receive image sensor data from an image sensor of a camera device; apply a non-linear color space mapping to the image sensor data using a neural network to obtain image data, wherein the non-linear color space mapping comprises a non-negative homogeneous function; and store the image data in a memory of the camera device.

19 Claims, 13 Drawing Sheets

(56) References Cited

U.S. PATENT DOCUMENTS

| | | | | |
|---|---|---|---|---|
| 11,847,571 | B2* | 12/2023 | Chen | G06N 3/084 |
| 12,062,242 | B2* | 8/2024 | Awasthi | G06V 10/82 |
| 12,079,306 | B2* | 9/2024 | Lo | G06F 18/214 |
| 2020/0304732 | A1* | 9/2020 | Finlayson | H04N 25/131 |
| 2021/0064047 | A1* | 3/2021 | Charette | G06N 3/045 |
| 2021/0318232 | A1 | 10/2021 | Kim et al. | |
| 2021/0365770 | A1 | 11/2021 | Bhatia et al. | |
| 2022/0131998 | A1* | 4/2022 | Morovic | G06N 20/20 |
| 2022/0142484 | A1* | 5/2022 | DiMaio | G16H 30/40 |
| 2022/0156943 | A1* | 5/2022 | Zhang | G06N 3/044 |
| 2022/0164601 | A1* | 5/2022 | Lo | G06N 20/00 |
| 2022/0164926 | A1* | 5/2022 | Kurmanov | G06T 5/70 |
| 2022/0262116 | A1* | 8/2022 | Hosseini | G06V 10/764 |
| 2022/0374658 | A1* | 11/2022 | Chen | G06F 18/241 |
| 2023/0043464 | A1* | 2/2023 | Song | H04N 13/204 |
| 2023/0049590 | A1* | 2/2023 | Bauer | G06V 10/774 |
| 2023/0154145 | A1* | 5/2023 | Zakharov | G06V 10/82 |
| | | | | 382/156 |

OTHER PUBLICATIONS

Yamaguchi, et al. "Color image reproduction based on the multispectral and multiprimary imaging: Experimental evaluation", 13 pages; found on the internet: https://www-oid.ip.titech.ac.jp/NV/SPIE4663-04.pdf.

Murakami, et al. "Color reproduction from low-SNR multispectral images using spatio-spectral Wiener estimation"; Optics Express, Mar. 17, 2008, vol. 16, No. 6, pp. 4106-8120, found on the internet: https://opg.optica.org/oe/fulltext.cfm?uri=oe-16-6-4106&id=154869.

Nyström, "Colorimetric and Multispectral Image Acquisition", 150 pages, found on the internet: https://www.diva-portal.org/smash/get/diva2:23572/FULLTEXT01.pdf.

Office Action dated Jan. 24, 2025 in corresponding TW Patent Application No. 112116334 (in Chinese), 6 pages.

* cited by examiner

500

| F1 (400nm) | F3 (440nm) | F5 (480nm) | F7 (520nm) |
|---|---|---|---|
| F2 (420nm) | F4 (460nm) | F6 (500nm) | F8 (540nm) |
| F9 (560nm) | F11 (600nm) | F13 (640nm) | F15 (680nm) |
| F10 (580nm) | F12 (620nm) | F14 (660nm) | F16 (700nm) |

FIG. 5

COLOR RECONSTRUCTION USING HOMOGENEOUS NEURAL NETWORK

BACKGROUND

The present disclosure relates to image processing. More particularly, the present disclosure describes systems and methods for color reconstruction of an output signal from a multispectral imaging sensor (MIS).

The goal of many imaging systems is to generate images that accurately reproduce the color and detail perceived by the human eye. In practice, capturing the true colors of a scene using a standard 3-color filter imaging sensor can be challenging. Even image sensors which utilize additional filters, such as MIS systems, may be unable to span the human eye color response with filters alone.

To address this, some systems further apply a transformation to the sensor output space to generate an image in a new color space that more closely matches the human eye color response. These transformations are typically transfer matrices between the output space and the required color space. However, constructing the transfer matrix can take additional development time for every sensor and filter setup, and the transfer matrix can be sensitive to noise, the choice of basis functions, and tuning parameters. Accordingly, there is a need in the art to develop systems and methods for color transformations with increased accuracy and robustness, as well as reduced implementation time.

SUMMARY

Embodiments of the present disclosure provide systems and methods for color reconstruction. Some embodiments apply non-linear operations to map from a sensor output space to a standard color space, such as CIE-XYZ. The non-linear operations may be more robust to noise, exposure, and other environmental factors. Some embodiments use a neural network (NN) trained on image sensor data and ground truth data to generate one or more homogeneous functions. In some cases, the neural network includes a plurality of weights corresponding to the nonlinear operations. In some cases, the neural network does not include biases.

Some embodiments include a multispectral imaging sensor (MIS) with a multispectral filter. In some cases, the multispectral filter includes multispectral filter groups. A multispectral filter group may include unit filters, each of which corresponding to a frequency band of the electromagnetic spectrum. In some cases, the unit filters correspond to bands in the visible light spectrum. In at least one embodiment, a multispectral filter group includes 16 unit filters arranged in a 4×4 array. However, the systems and methods described herein may be applied to any arbitrary color filter.

Some embodiments of the NN implement homogeneous function(s). For example, some implementations of the NN are composed of nonnegative homogeneous layers, which include rectified linear unit (ReLU) activations and matrix multiplications. Once the weights of the NN are initialized on one imaging system, the weights may be transferred to a second imaging system to initialize a second NN. After an initialization, the second imaging system may use fewer image captures (in some cases, only one) to tune its NN.

A method, apparatus, non-transitory computer readable medium, and system for color reconstruction are described. One or more aspects of the method, apparatus, non-transitory computer readable medium, and system include receiving image sensor data from an image sensor of a camera device; applying a non-linear color space mapping to the image sensor data using a neural network to obtain image data, wherein the non-linear color space mapping comprises a non-negative homogeneous function; and storing the image data in a memory of the camera device.

A method, apparatus, non-transitory computer readable medium, and system for color reconstruction are described. One or more aspects of the method, apparatus, non-transitory computer readable medium, and system include receiving training data including a color sample and ground-truth image data in a first color space; obtaining image sensor data corresponding to the color sample from a sensor of a camera device; applying a non-linear color space mapping to the image sensor data using a neural network to obtain predicted image data in the first color space; and updating parameters of the neural network based on the predicted image data and the ground-truth image data.

An apparatus, system, and method for color reconstruction are described. One or more aspects of the apparatus, system, and method include an image sensor configured to capture image sensor data; a neural network configured to apply a non-linear color space mapping to the image sensor data to obtain image data; and a memory configured to store the image data.

BRIEF DESCRIPTION OF THE DRAWINGS

FIG. 5 shows an example of a multispectral filter group according to aspects of the present disclosure.

DETAILED DESCRIPTION

Figure 1:
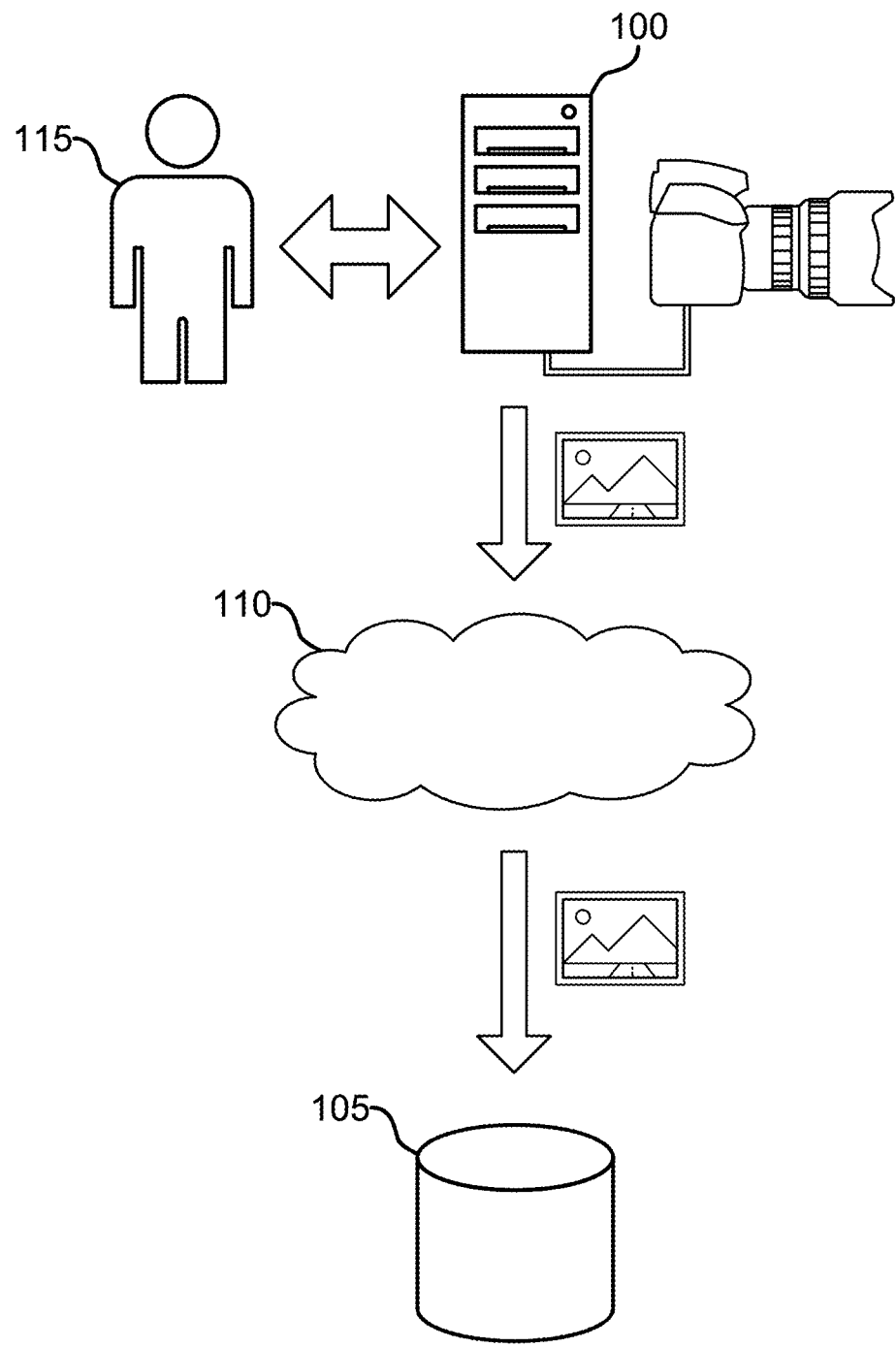
FIG. 1 shows an example of a multispectral imaging system according to aspects of the present disclosure.

The present disclosure describes systems and methods for mapping one color space to another. For example, some of the systems and methods described herein use a non-linear color space mapping implemented by a neural network to perform color reconstruction. In detail, a multispectral imaging sensor (MIS) may capture light and convert it to signals that represent an image in a first color space. Then, the system may convert the image in the first color space to a different color space, such as the CIE-1931 XYZ color-space.

The CIE-1931 XYZ color-space (XYZ) is a standard linear space which spans the human eye color response. Image data in this space can be packaged or transformed for other downstream applications, such as for display or print. Such transformations from the XYZ space to other downstream color spaces are well defined. However, the transformation from the MIS sensor output to the XYZ space is highly dependent on the configuration of the MIS. Furthermore, the relationships from the MIS output to the XYZ space are not accurately captured by a linear transformation only, i.e., a transfer matrix, as the linear transfer matrix can become less accurate in response to environmental variables such as noise and increased luminosity.

Accordingly, embodiments implement a color space mapping that includes linear and non-linear operations. The linear and non-linear operations include weights that adjust the relationship between the input signal and the output signal. These weights, and other parameters of the neural network, are adjusted by a deep neural network (NN) model that is trained based on ground truth data, i.e., the known target color mapping given a controlled sensor output signal.

Details regarding the architecture of an example multispectral imaging system and apparatus are provided with reference to FIGS. 1-7. Example processes for color space transformations and color reconstruction are described with reference to FIGS. 8-10. Example training processes for the neural network and additional uses for the neural network are described with reference to FIGS. 11-13.

Multispectral Imaging System

An apparatus for color reconstruction is described. One or more aspects of the apparatus include an image sensor configured to capture image sensor data; a neural network configured to apply a non-linear color space mapping to the image sensor data to obtain image data; and a memory configured to store the image data. The non-linear color space mapping may transform image sensor data in a first color space to image data in a second color space, wherein the transformation includes non-linear operations.

Some examples of the apparatus, system, and method further include a training component configured to update parameters of the neural network based on a color sample, ground-truth image data corresponding to the color sample, and predicted image data generated by the neural network. Some examples further include a display component configured to display an image based on the image data. In some aspects, the image sensor is a multispectral image sensor (MIS) and comprises a pixel array and a multispectral filter. In some aspects, each node of the neural network comprises a non-negative homogeneous activation function.

Some examples of the apparatus, system, and method further include a color correction component configured to apply a color correction to the image sensor data prior to the non-linear color space mapping. The color correction may include operations such as white-balance adjustment, exposure adjustment, gamma adjustment, or the like.

FIG. 1 shows an example of a multispectral imaging system according to aspects of the present disclosure. The example shown includes multispectral imaging apparatus 100, database 105, network 110, and user 115.

In one example, user 115 operates multispectral imaging apparatus 100 to capture image sensor data. Multispectral imaging apparatus 100 may capture the image sensor data in a first color space, such as an MIS color space. Multispectral imaging apparatus 100 then applies a non-linear color mapping to the image sensor data to generate image data in a second color space. The second color space may be the XYZ color space. Then, multispectral imaging apparatus 100 stores the image data in a memory. The memory can be a memory of multispectral imaging apparatus 100, or belong to database 105. Network 110 may facilitate a connection between multispectral imaging apparatus 100 and database 105. In at least one embodiment, multispectral imaging apparatus 100 stores the image sensor data before applying the non-linear color mapping to it.

In some examples, multispectral imaging apparatus 100 is implemented on a local machine of user 115. For example, multispectral imaging apparatus 100 may include one or all of its components within a single device. Multispectral imaging apparatus 100 may additionally be implemented on a networked server. A server provides one or more functions to users linked by way of one or more of various networks (e.g., network 110). In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Database 105 may hold images, software updates, additional instructions, or other data used by multispectral imaging apparatus 100. A database, such as database 105, is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user (e.g., user 115) interacts with a database controller. In other cases, the database controller may operate automatically without user interaction.

Network 110 may be referred to as a "cloud". A cloud is a computer network configured to provide on-demand availability of computer system resources, such as data storage and computing power. In some examples, the cloud provides resources without active management by user 115. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, multispectral imaging apparatus 100 captures an image in an MIS space, and performs a non-linear color space mapping to transform the image to a target color space, such as the XYZ space. Multispectral imaging apparatus 100 is an example of, or includes aspects of, the corresponding element described with reference to FIGS. 2 and 13.

Figure 2:
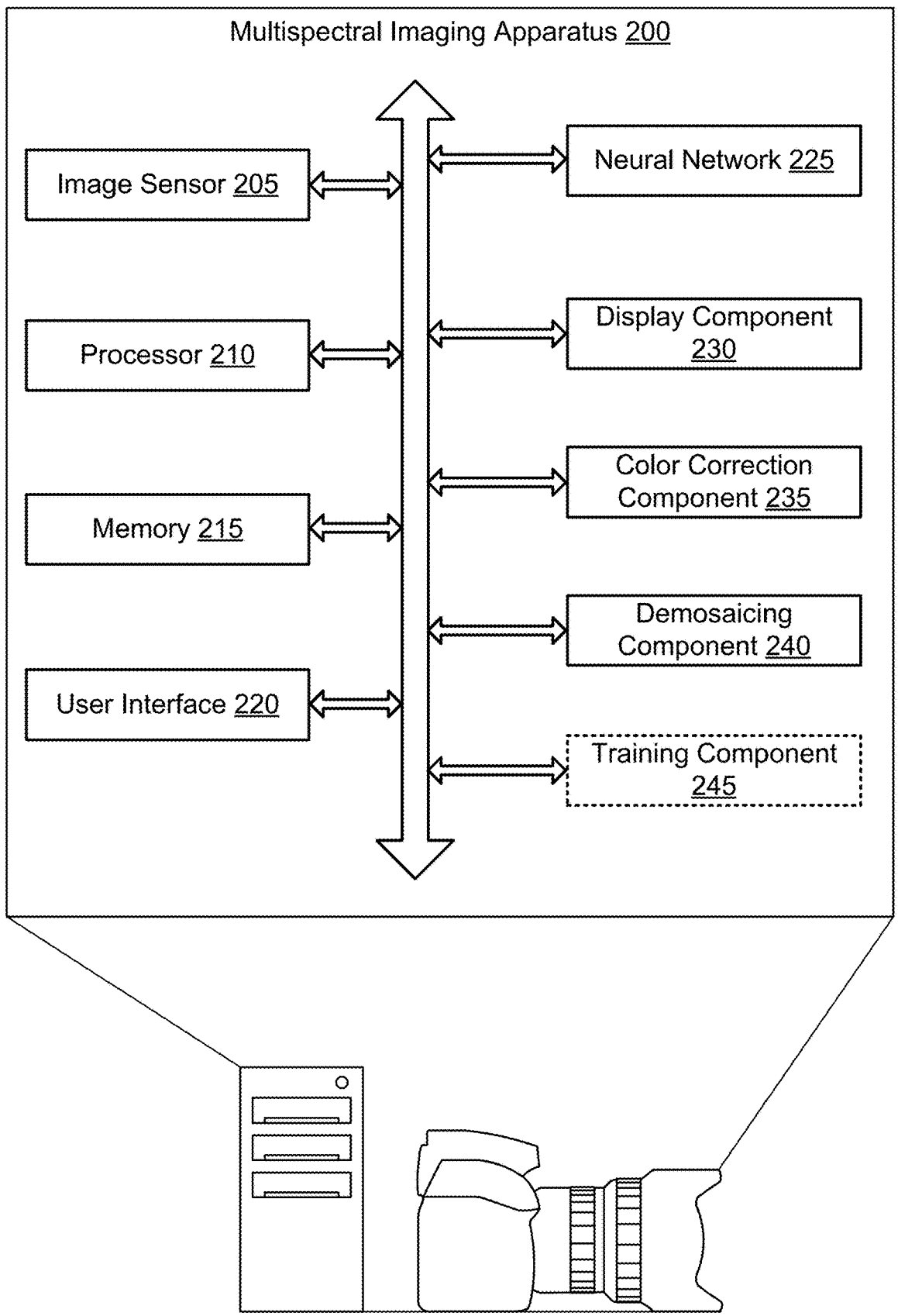
FIG. 2 shows an example of a multispectral imaging apparatus according to aspects of the present disclosure.

FIG. 2 shows an example of a multispectral imaging apparatus 200 according to aspects of the present disclosure. The example shown includes multispectral imaging apparatus 200, image sensor 205, processor 210, memory 215, user interface 220, neural network 225, display component 230, color correction component 235, demosaicing component 240, and training component 245. Multispectral imaging apparatus 200 is an example of, or includes aspects of, the corresponding element described with reference to FIGS. 1 and 13.

Multispectral imaging apparatus 200 may include an optical instrument such as image sensor 205 for recording or capturing images, which may be stored locally, transmitted to another location, etc. For example, image sensor 205 may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices. In some aspects, the image sensor data includes multispectral image sensor data.

According to some aspects, image sensor 205 obtains image sensor data corresponding to a color sample from a sensor of a camera device. In some aspects, the image sensor 205 is a multispectral image sensor (MIS), and includes a pixel array and a multispectral filter. In some example embodiments, the multispectral filter includes 16 unit filters forming a multispectral filter group, and a plurality of multispectral filter groups are arranged across pixels of the pixel array. Image sensor 205 is an example of, or includes aspects of, the corresponding element described with reference to FIG. 4.

Processor 210 includes circuitry configured to implement various components and functions of multispectral imaging apparatus 200, and may be used to implement or operate neural network 225, display component 230, color correction component 235, demosaicing component 240, training component 245, or a combination thereof. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array (e.g., memory 215) using a memory controller. In other cases, a memory controller is integrated into the processor. In some cases, the processor is configured to execute computer-readable instructions stored in a memory to perform various functions, such as functions used to execute the methods described herein. In some embodiments, a processor includes special purpose components for modem processing, baseband processing, digital signal processing, or transmission processing.

Memory 215 is used to store data used by multispectral imaging apparatus 200. According to some aspects, memory 215 stores the image data once it has been reconstructed using neural network 225. Memory 215 may include a memory device configured to store images, instructions executable by processor 210, and the like. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause processor 210 to perform various functions or implement various components described herein. In some cases, memory 215 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory 215 store information in the form of a logical state.

A user interface 220 may enable a user to interact with a device. For example, user interface 220 enables a user to capture and store images with multispectral imaging apparatus 200. In some embodiments, the user interface 220 may include an audio device, such as an external speaker system, an external display device such as a display screen, or an input device (e.g., a remote control device interfaced with the user interface 220 directly or through an IO controller module). In some cases, a user interface 220 may further include a graphical user interface 220 (GUI).

Neural network 225 may include parameters and functions used to implement a non-linear color mapping as described herein. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs. For example, the desired outputs may be values in the XYZ space that are generated to correspond to the input values from the MIS space after an accurate color reconstruction.

Neural network 225 may include layers that implement linear and non-linear operations. In some embodiments, the non-linear operations include rectified linear unit (ReLU) activations. In a neural network, an activation function may be used to transforming summed weighted inputs from a node into the activation of the node or an output. A ReLU activation function comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with back-propagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

According to some aspects, neural network 225 applies a non-linear color space mapping to the image sensor data using a neural network 225 to obtain image data, where the non-linear color space mapping includes a non-negative homogeneous function. In some examples, neural network 225 converts the image data from a first color space to a second color space, where the image data is stored using a format based on the second color space. In some aspects, the non-linear color space mapping converts the image sensor data to a three-dimensional color space. For example, the second color space may be the CIE-XYZ color space.

Display component 230 handles the displaying of images from memory. According to some aspects, display component 230 retrieves image data from memory 215. In some examples, display component 230 displays an image based on the image data. The image data may be in the display device color space converted from the target space, e.g., the XYZ space.

Color correction component 235 may or may not apply a color correction to either the image sensor data or the image data. Examples of color corrections include white-balance adjustment, exposure adjustment, gamma adjustment, or the like. According to some aspects, color correction component 235 applies a color correction to the image sensor data prior to applying the non-linear color space mapping. In some examples, color correction component 235 applies a color correction to the image data prior to storing the image data.

Demosaicing component 240 optionally performs a demosaicing operation on the image sensor data. The demosaicing operation may include interpolation operations which estimate the color levels for all color components, not just the color component captured by the unit filter over a given pixel. In this way, the demosaicing operation reconstructs an image from the raw sensor data, in which each pixel is spatially undersampled, into the MIS color space, where each pixel represents all color components. There are several existing algorithms for demosaicing which may be used. While demosaicing generates a full color image in MIS space, it does not necessarily produce an image in a target color space such as the XYZ space. This is a separate reconstruction, which will be described in greater detail later. In at least one embodiment, the system does not perform a demosaicing operation before transforming the signal output space to the target color space. According to some aspects, demosaicing component 240 applies a demosaicing process to the image sensor data prior to applying the non-linear color space mapping.

Training component 245 updates neural network 225 based on a difference between predicted data in a second color space and ground truth data in the second color space. According to some aspects, training component 245 receives training data including a color sample and ground-truth image data in a first color space. In some examples, training component 245 updates parameters of the neural network 225 based on the predicted image data and the ground-truth image data. The color sample may include a set of colors selected based on a distribution in the first color space, and where the parameters of the neural network 225 are updated based on the set of colors. In some aspects, the training data includes a set of color samples and corresponding ground-truth image data for each of the set of color samples, and where the parameters of the neural network 225 are updated based on the set of color samples and the corresponding ground-truth image data.

According to some aspects, training component 245 is configured to update parameters of the neural network 225 based on a color sample, ground-truth image data corresponding to the color sample, and predicted image data generated by the neural network 225. In at least one embodiment, training component 245 is implemented in a different apparatus other than multispectral imaging apparatus 200.

Figure 3:
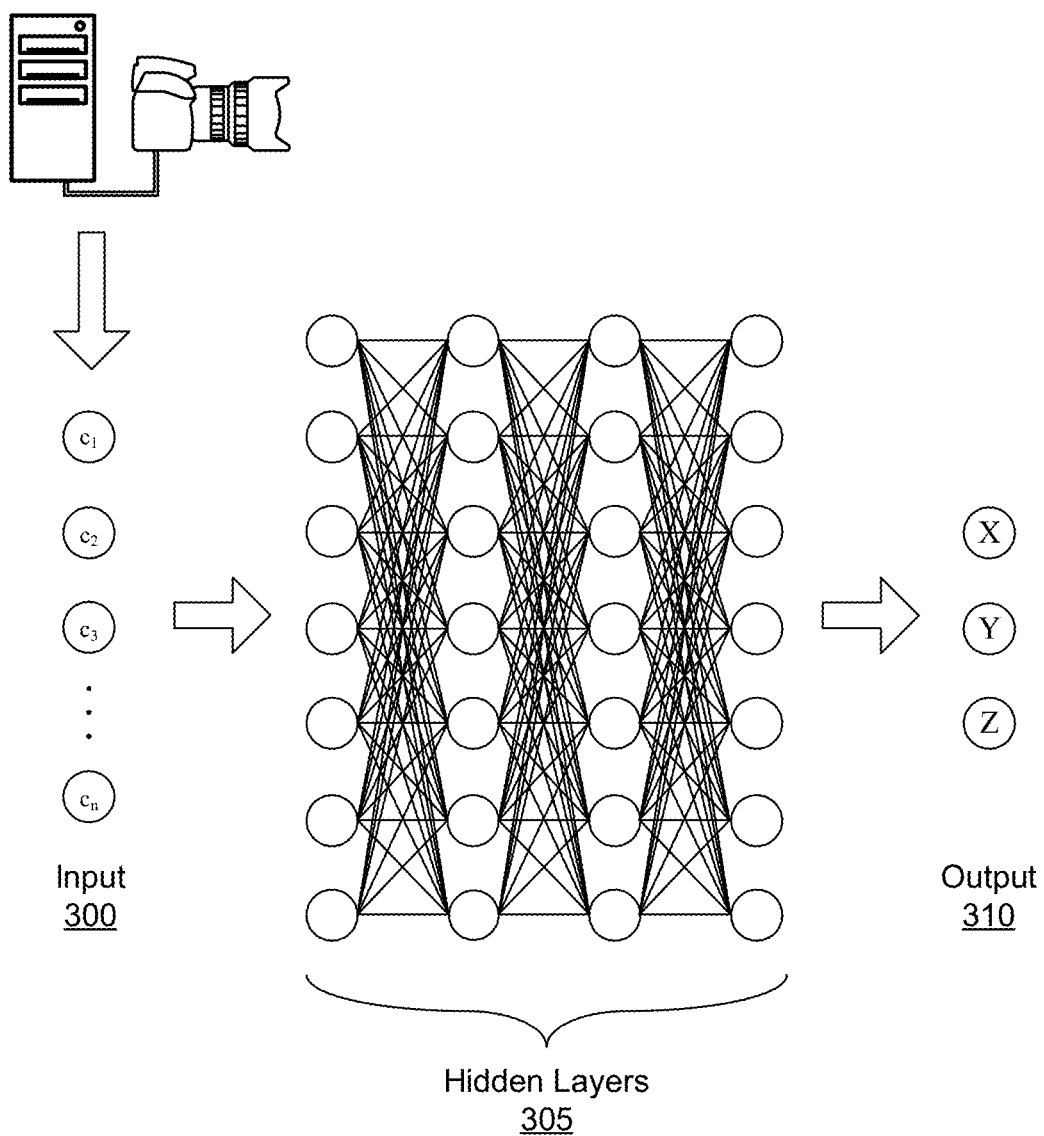
FIG. 3 shows an example of a neural network according to aspects of the present disclosure.

FIG. 3 shows an example of a neural network according to aspects of the present disclosure. The example shown includes input 300, hidden layers 305, and output 310.

In this example, input 300 corresponds to the image sensor data in a first color space output from the multispectral imaging apparatus. The first color space may be an MIS color space. Then, hidden layers 305 execute linear and non-linear transformations on the image sensor data to generate output 310, which contains image data in the second color space.

As discussed above, the CIE-1931 XYZ color-space (XYZ) is a standard linear space which spans the human eye color response. In some embodiments, output 310 is a vector that includes XYZ color-space values. In some embodiments, input 300 is a vector that includes 16-dimensional information from the image sensor of the multispectral imaging apparatus.

The xyz values per wavelength λ are nonnegative, and the total XYZ of a given spectrum are the sum of the xyz per wavelength weighted by the intensity I and the object reflectance R. This relationship is shown with Equation (1):

$$X = k \int_\lambda I(\lambda) R(\lambda) \bar{x}(\lambda) d\lambda$$
$$Y = k \int_\lambda I(\lambda) R(\lambda) \bar{y}(\lambda) d\lambda$$
$$Z = k \int_\lambda I(\lambda) R(\lambda) \bar{z}(\lambda) d\lambda$$
(1)

Therefore, XYZ space values scale linearly with global scaling of the intensity I. In some cases, this causes sensitivity to noise and changes in exposure. Therefore, embodiments further include non-linear operations, which impart robustness to these changes.

Figure 4:
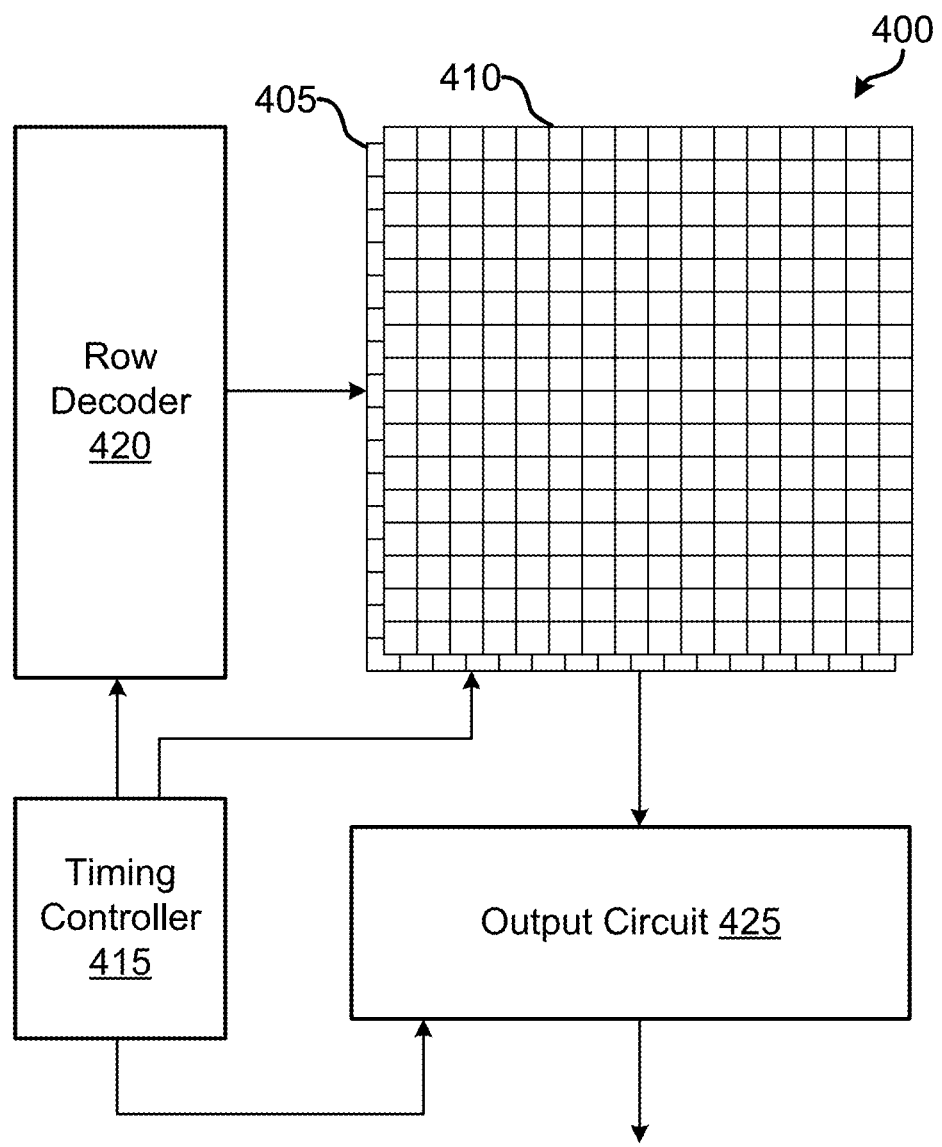
FIG. 4 shows an example of an image sensor according to aspects of the present disclosure.

FIG. 4 shows an example of an image sensor 400 according to aspects of the present disclosure. The example shown includes image sensor 400, pixel array 405, multispectral filter 410, timing controller 415, row decoder 420, and output circuit 425. Image sensor 400 is an example of, or includes aspects of, the corresponding element described with reference to FIG. 2. Multispectral filter 410 is an example of, or includes aspects of, the corresponding element described with reference to FIG. 7.

Embodiments use multispectral filter 410 to generate an MIS signal. For example, light passing through the multispectral filter 410 onto pixel array 405 causes image sensor 400 to generate a signal in the MIS color space. Then, embodiments use a NN, which may be composed of non-negative homogeneous layers, to transform the MIS signal to the desired output space, such as XYZ.

Embodiments of the multispectral imaging apparatus include 16 channels, each of which corresponds to a wavelength band of light. Other embodiments of the multispectral imaging apparatus can use different numbers of channels, such as 8, 31, or any arbitrary number, though there are typically at least 3 channels. A bandwidth of each channel in the MIS (which, in this example, includes more than 3 channels) may be narrower than the R, G, and B bands, and the total bandwidth of all the channels include the RGB bandwidth. In some cases, the total bandwidth of all channels is wider than the RGB bandwidth, and may encompass visible light as well as near ultra-violet and near-infrared.

In some embodiments, the multispectral imaging apparatus encompasses a bandwidth from 350 nm to about 1000 nm. In such cases, the multispectral image obtained by the MIS may be a hyperspectral image, and include wavelengths spanning from ultraviolet to infrared. The multispectral image can be obtained using all available channels of the MIS, or it may be obtained by selecting a group of channels. The channels may correspond to filters disposed on a pixel array of the MIS. Since the filters capture a distribution of frequencies rather than an exact band, some nonvisible light is able to reach the sensor. This can result in the inaccurate reproduction of colors. Accordingly, embodiments implement a non-linear color mapping that can minimize the effects of nonvisible light on image sensor 400.

Image sensor 400 may include, but is not limited to, a charge coupled device (CCD) image sensor or a complementary metal oxide semiconductor (CMOS) image sensor. In some embodiments, pixel array 405 includes a plurality of pixels arranged in rows and columns and configured to convert incident light into electrical signals. In at least one embodiment, pixel array 405 additionally includes a micro lens or plurality of micro lenses disposed on the pixels.

Filter 410 includes a plurality of unit filters that transmit (i.e., allow to pass) light of different wavelength ranges. Filter 410 may be disposed on top of pixel array 405. For example, the plurality of unit filters of filter 410 may be arranged in two dimensions, and may directly overlap corresponding pixels from pixel array 405.

Row decoder 420 selects one of the rows from pixel array 405 in response to a row address signal. The row address signal may be output from timing controller 415.

Output circuit 425 outputs a light detection signal to pixels in pixel array 405. The light detection signal may instruct the pixels to accrue charges to capture light, or release previously accrued charges. In some embodiments, output circuit 425 outputs the light detection signal in units of columns from the pixels arranged in the row selected by row decoder 420. To this end, output circuit 425 may include a column decoder and an analog-to-digital converter (ADC). In some embodiments, output circuit 425 includes a plurality of ADCs arranged for each column between a column decoder and pixel array 405.

In some embodiments, row decoder 420, timing controller 415, and output circuit 425 are implemented on separate chips. However, any combination of row decoder 420, timing controller 415, and output circuit 425 may be implemented on a single chip. In at least one embodiment, a processor as described with reference to FIG. 2 and configured to process image signals output through output circuit 425 may be implemented on a single chip along with timing controller 145, row decoder 420, and output circuit 425.

FIG. 5 shows an example of a multispectral filter group 500 according to aspects of the present disclosure. In this example, multispectral filter group 500 includes 16 unit filters F1-F16, each of which transmits a peak wavelength of between 400 nm and 700 nm.

Figure 6:
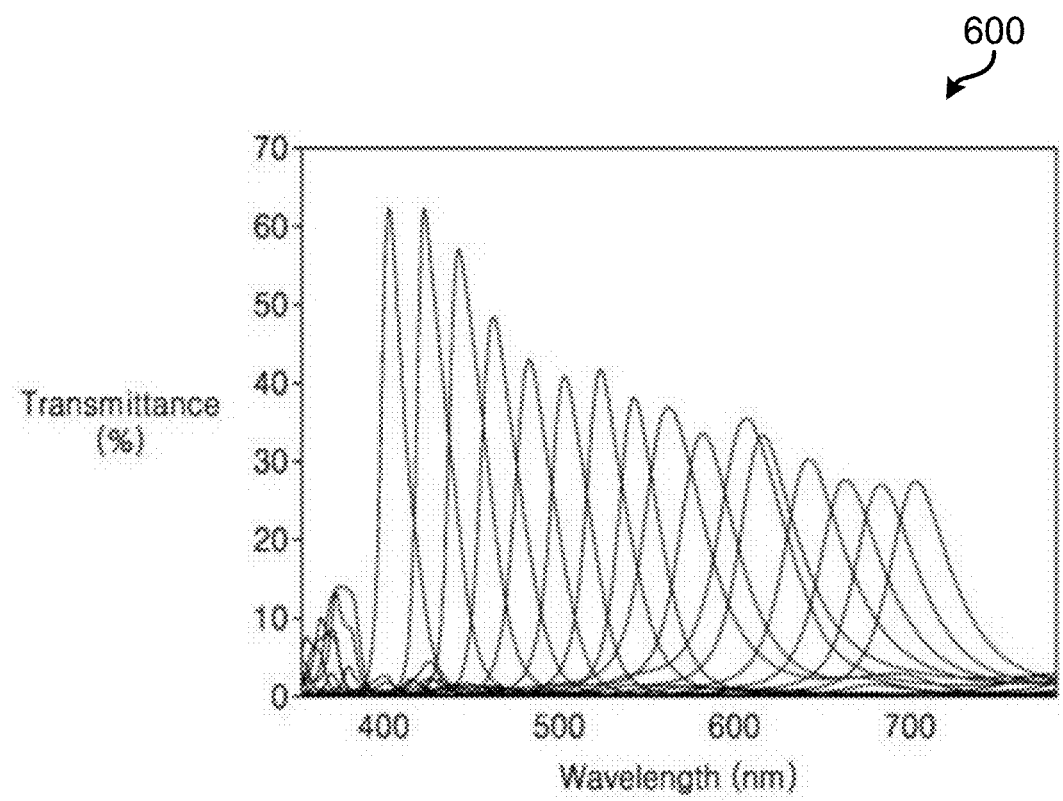
FIG. 6 shows an example of a transmittance graph according to aspects of the present disclosure.

FIG. 6 shows an example of a transmittance graph 600 according to aspects of the present disclosure. The transmittance graph includes transmittance spectrums for an MIS filter according to embodiments. In the example shown, there are 16 lines representing the transmittance spectrums for first to sixteenth unit filters F1 to F16. Referring to the Figure, the first to sixteenth unit filters F1 to F16 may effectively capture the center wavelengths, e.g., wavelengths in a range of about 400 nm to about 700 nm. As shown by the graph, the unit filters may additionally capture some wavelengths outside of this band. When light outside the visible spectrum is transmitted to the image sensor, inaccurate color reproduction can result in the produced images. Accordingly, embodiments implement a non-linear color mapping that can minimize these effects. This will be discussed in detail later.

Figure 7:
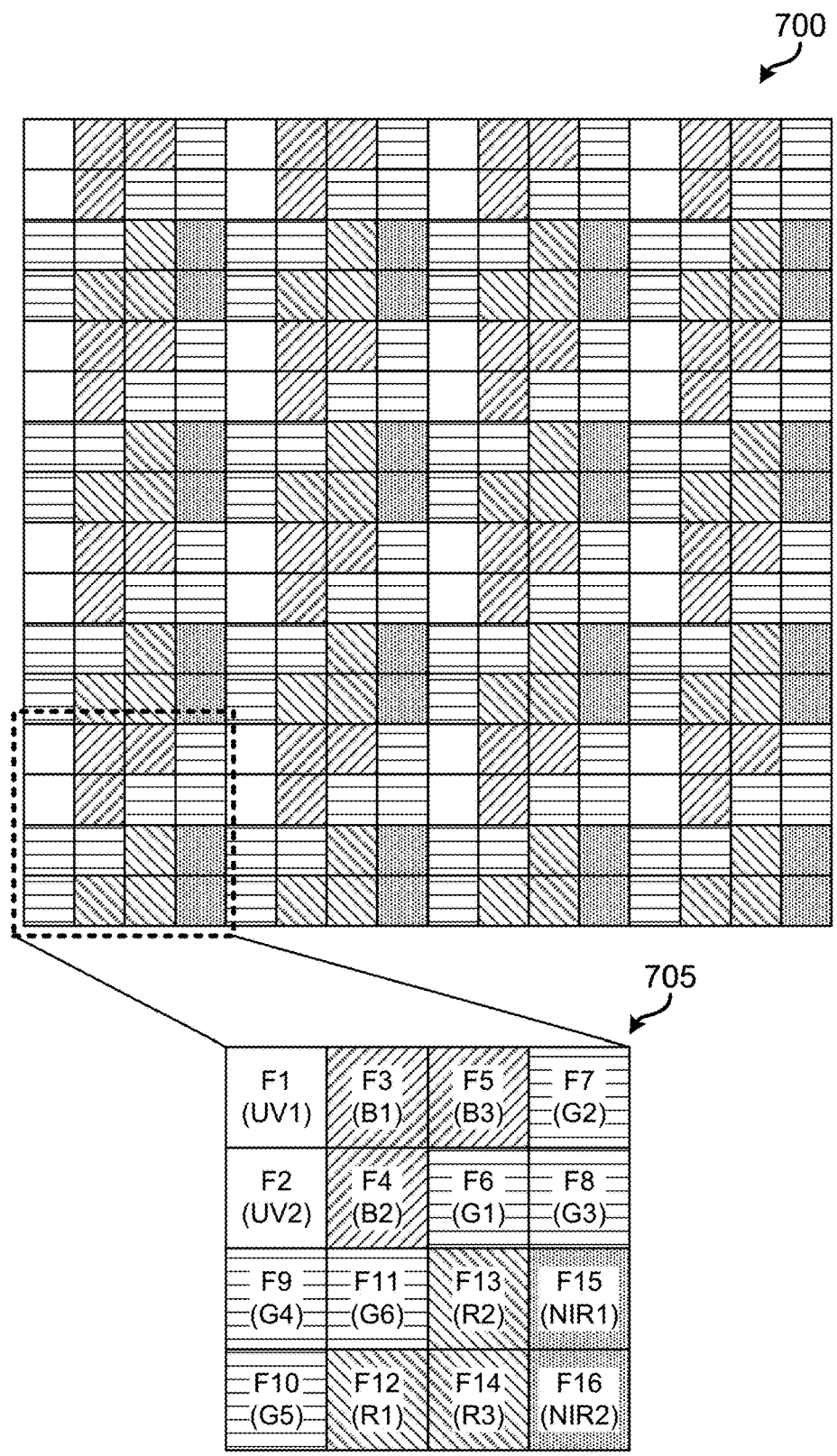
FIG. 7 shows an example of a multispectral filter according to aspects of the present disclosure.

FIG. 7 shows an example of a multispectral filter 700 according to aspects of the present disclosure. The example shown includes multispectral filter 700 and multispectral filter group 705. Multispectral filter 700 is an example of, or includes aspects of, the corresponding element described with reference to FIG. 4.

Multispectral filter 700 includes a plurality of multispectral filter groups 705. In some embodiments, multispectral filter groups 705 are arranged two-dimensionally across the multispectral filter 700. Each multispectral filter group 705 includes a plurality of unit filters as described with reference to FIG. 6.

In one embodiment, each multispectral filter group 705 includes 16 unit filters F1 to F16 arranged in a 4×4 array. For example, unit filters F1-F2 may correspond to ultraviolet or near-ultraviolet bands, unit filters F3-F5 may correspond to blue color bands, unit filters F7-F11 may correspond to green color bands, unit filters F12-F14 may correspond to red color bands, and unit filters F15-F16 may correspond to infrared or near infrared color bands. Other embodiments of the multispectral imaging apparatus may be designed to produce images containing information about light from outside the visible spectrum or across different bands. Accordingly, other embodiments may include unit filters corresponding to different wavelength bands.

The unit filters in multispectral filter group 705 may have a resonance structure including two reflection plates. The wavelength band transmitted by the unit filter may be determined according to the characteristics of the resonance structure. For example, the transmission wavelength band may be adjusted by changing the material of the reflection plate, the material in the cavity, and the thickness of the cavity. In some embodiments, the unit filter may include a structure using a grating, a nanostructure, a structure using a distributed Bragg reflector (DBR), or other means to adjust the transmitted band. In some embodiments, the pixels of the image sensor may be variously arranged according to color and transmittance characteristics of the sensor.

Multispectral Color Reconstruction

A method for color reconstruction is described. One or more aspects of the method include receiving image sensor data from an image sensor of a camera device; applying a non-linear color space mapping to the image sensor data using a neural network to obtain image data, wherein the non-linear color space mapping comprises a non-negative homogeneous function; and storing the image data in a memory of the camera device. In some aspects, the image sensor data comprises multispectral image sensor data.

Some examples of the method, apparatus, non-transitory computer readable medium, and system further include retrieving the image data from the memory. Some examples further include displaying an image based on the image data. Some examples of the method, apparatus, non-transitory computer readable medium, and system further include converting the image data from a first color space to a second color space, wherein the image data is stored using a format based on the second color space.

Some examples of the method, apparatus, non-transitory computer readable medium, and system further include applying a color correction to the image sensor data prior to applying the non-linear color space mapping. In some examples, the color correction is applied to the image data prior to storing the image data.

In some aspects, the non-linear color space mapping converts the image sensor data to a three-dimensional color space. In some examples, this color space is the CIE-XYZ color space. Some examples of the method, apparatus, non-transitory computer readable medium, and system further include applying a demosaicing process to the image sensor data prior to applying the non-linear color space mapping.

Figure 8:
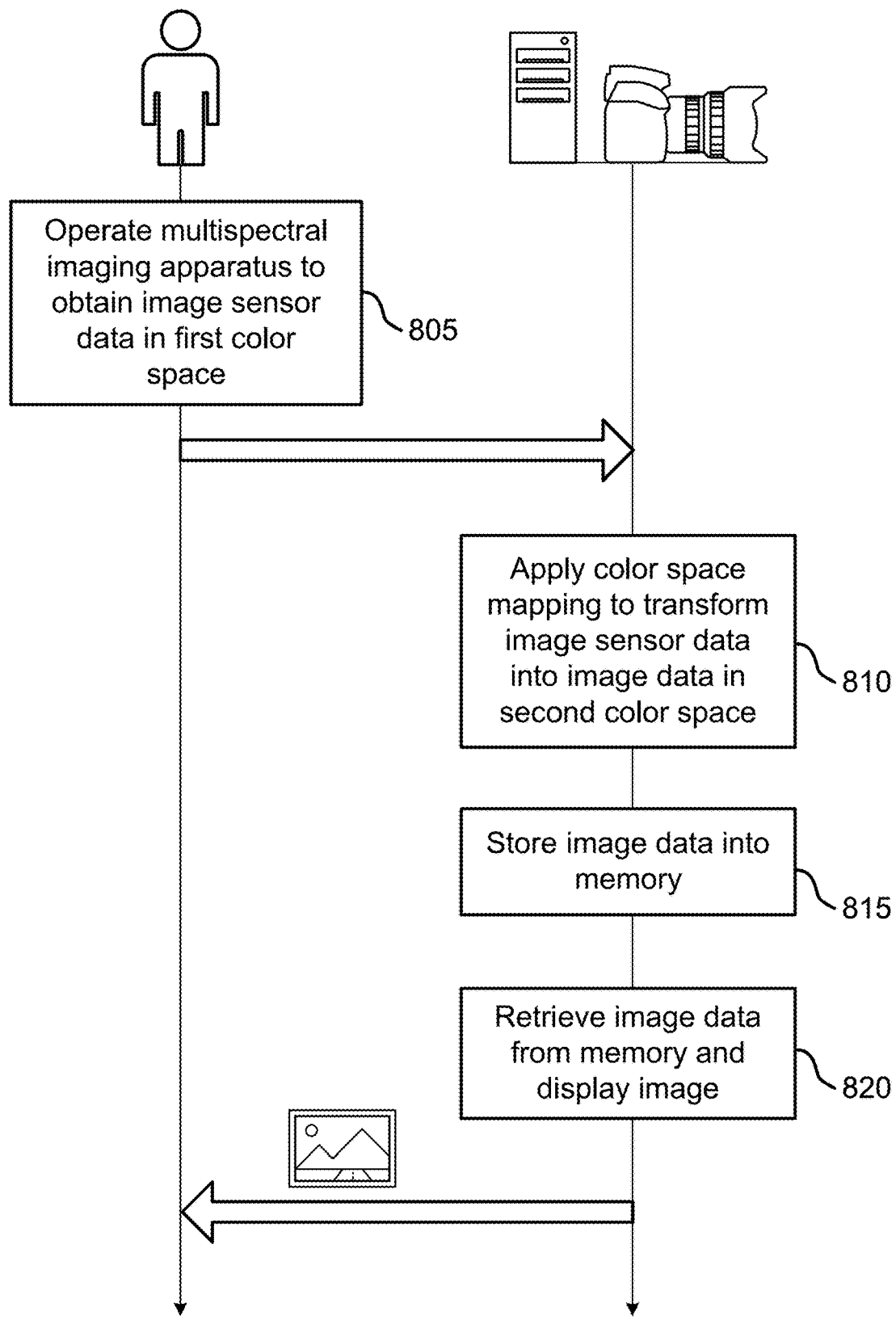
FIG. 8 shows an example of a method for displaying a multispectral image according to aspects of the present disclosure.

FIG. 8 shows an example of a method 800 for displaying a multispectral image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the user operates multispectral imaging apparatus to obtain image sensor data in a first color space. This operation may include framing the multispectral imaging apparatus such that is oriented towards a subject, and using a user interface to struct the multispectral imaging apparatus to capture the frame. The multispectral imaging apparatus may optionally apply demosaicing to the image sensor data.

At operation 810, the system applies color space mapping to transform image sensor data into image data in a second color space. In some embodiments, the color space mapping is implemented by a neural network, which includes non-negative homogeneous layers.

At operation 815, the system stores image data into memory. The memory may be a part of the multispectral imaging apparatus, or may be a part of a database that is networked with the multispectral imaging apparatus.

At operation 820, the system retrieves image data from memory and displays the image. In some cases, the image data in the second color space is additionally transformed before display. For example, if the image data is stored in the XYZ space, it may be transformed to an RGB space for display.

Figure 9:
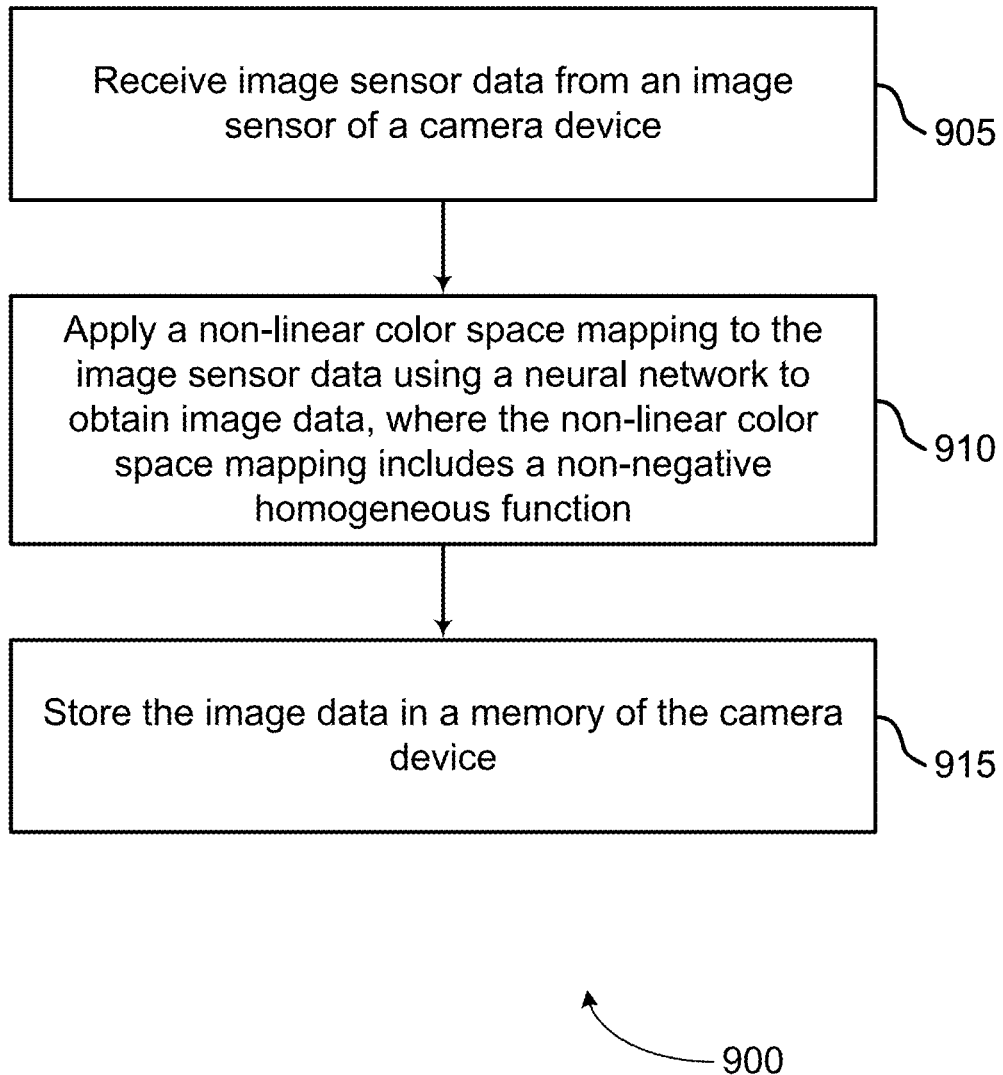
FIG. 9 shows an example of a method for transforming image sensor data according to aspects of the present disclosure.

FIG. 9 shows an example of a method 900 for transforming image sensor data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

As discussed previously, embodiments include an NN which preserves a homogeneity property between a first color space and a second color space. A nonnegative homogeneous function F is defined as a function for which the output scales linearly when scaling the input by a non-negative real scalar:

$$F(s \cdot \vec{v}) = s \cdot F(\vec{v}) \forall s \geq 0, \forall \vec{v} \tag{2}$$

Non-negative homogeneous functions include: multiplication by any matrix, the ReLU activation function, norm functions, and more. For example, a ReLU is homogeneous as shown by Eq. (3):

$$\mathrm{relu}(s \cdot \vec{v}) = \max(0, s \cdot \vec{v}) = s \cdot \max(0, \vec{v}) = s \cdot \mathrm{relu}(s \cdot \vec{v}) \tag{3}$$

However, the addition of a non-zero constant to a homogeneous operation is not homogeneous, as shown by Eq. (4):

$$s \cdot \vec{v} + b \neq s \cdot (\vec{v} + b) \forall b \neq 0 \tag{4}$$

Accordingly, embodiments of the NN include weights, but may not include biases, which are non-zero constants. The composition of any two homogeneous functions F and G is also a homogeneous function:

$$F(G(s \cdot \vec{v})) = F(s \cdot G(\vec{v})) = s \cdot F(G(\vec{v})) \tag{5}$$

Therefore, a transformation performed by an NN which is composed of nonnegative homogeneous layers, such as layers with homogeneous functions and zero bias, is a nonnegative homogeneous function.

To perform accurate transformations between MIS output to a target color space, such as XYZ, embodiments assume the MIS output from the multispectral imaging apparatus is in the linear response region. This means that the signal output scales linearly with intensity. Since both the XYZ representation of the measured spectrum and the MIS output scale linearly with intensity, both spaces can be described as nonnegative homogeneous functions of each other. Accordingly, the mapping between the two spaces preserves the homogeneity property.

Some comparative systems perform a mapping between two spaces, such as between the MIS signal and the XYZ reconstruction, by assuming a linear mapping between the two spaces. Such a linear mapping is characterized by a signal transfer matrix. To find the matrix, the comparative systems may use a pseudo inversion of the sensor measurements such as Penrose-Moore, Principal Eigenvector, and other regression procedures. However, these methods are sensitive to noise, and typically depend on explicit choice of basis-functions and hand tuning of regularization parameters.

Further, the linear mapping is a large assumption and may be inaccurate. Since the different color channels of the MIS overlap, and since both the MIS space and the XYZ space are different subspaces of the color spectrum, it is not obvious that the transformation between the spaces can be characterized by simple matrix multiplication.

Homogeneous functions include matrix multiplication as well as several non-linear functions. The nonnegative homogeneous functions described above, such as matrix multiplications, ReLU activations, and comparative operations (e.g., min, max, median), preserve the homogeneity property between the two spaces, and allow different relationships between the spaces which are robust to environmental changes. For example, the homogeneous mapping is robust to global changes of scale, such as changes in gain, exposure, and illumination intensity.

Accordingly, embodiments implement a mapping that includes not only matrix multiplications, but all nonnegative homogeneous functions. Embodiments include a nonnegative homogenous neural network including nonnegative homogeneous layers to implement this mapping. Accordingly, color reconstruction provided by embodiments disclosed herein may have increased accuracy, robustness, and faster implementation time.

At operation 905, the system receives image sensor data from an image sensor of a camera device. In some cases, the operations of this step refer to, or may be performed by, an image sensor as described with reference to FIGS. 2 and 4.

At operation 910, the system applies a non-linear color space mapping to the image sensor data using a neural network to obtain image data, where the non-linear color space mapping includes a non-negative homogeneous function. The non-negative homogenous function can include a ReLU operation, a comparative operation, or others as described above. In some cases, the operations of this step refer to, or may be performed by, a neural network as described with reference to FIG. 2.

At operation 915, the system stores the image data in a memory of the camera device. In some cases, the operations of this step refer to, or may be performed by, a memory as described with reference to FIG. 2. In at least one embodiment, the system stores the image data to a database networked with the camera device.

Figure 10:
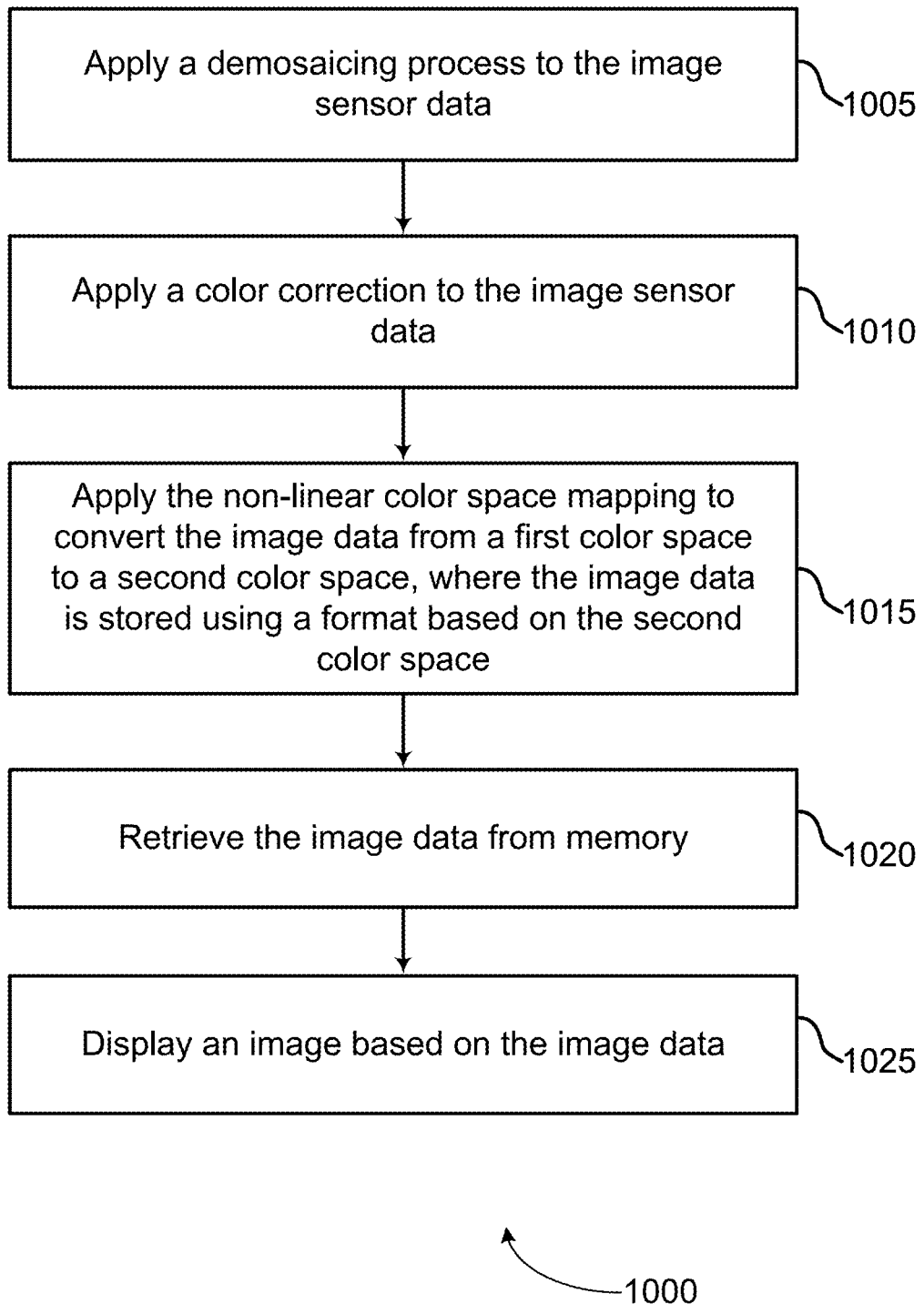
FIG. 10 shows an example of a method for displaying an image according to aspects of the present disclosure.

FIG. 10 shows an example of a method 1000 for displaying an image stored in the camera device, i.e., the multispectral imaging apparatus, according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system applies a demosaicing process to the image sensor data. In some cases, the operations of this step refer to, or may be performed by, a demosaicing component as described with reference to FIG. 2. The demosaicing operation may include interpolation operations which estimate the color levels for all color components surrounding the single color component captured by a pixel.

At operation 1010, the system applies a color correction to the image sensor data. In some cases, the operations of this step refer to, or may be performed by, an image sensor as described with reference to FIGS. 2 and 4. The color correction may include operations such as white-balance adjustment, exposure adjustment, gamma adjustment, or the like.

At operation 1015, the system applies the non-linear color space mapping to convert the image data from a first color space to a second color space, where the image data is stored using a format based on the second color space. In some cases, the operations of this step refer to, or may be performed by, a neural network as described with reference to FIG. 2.

At operation 1020, the system retrieves the image data from memory. In some cases, the operations of this step refer to, or may be performed by, a memory as described with reference to FIG. 2. At operation 1025, the system displays an image based on the image data. In some cases, the image data in the second color space is additionally transformed before display. For example, if the image data is stored in the XYZ space, it may be transformed to an RGB space for display.

Training

A method for color reconstruction is described. One or more aspects of the method include receiving training data including a color sample and ground-truth image data in a first color space; obtaining image sensor data corresponding to the color sample from a sensor of a camera device; applying a non-linear color space mapping to the image sensor data using a neural network to obtain predicted image data in the first color space; and updating parameters of the neural network based on the predicted image data and the ground-truth image data. In some aspects, the non-linear mapping comprises a non-negative homogeneous function.

In some aspects, the color sample comprises a plurality of colors selected based on a distribution in the first color space, and wherein the parameters of the neural network are updated based on the plurality of colors. In some aspects, the training data includes a plurality of color samples and corresponding ground-truth image data for each of the plurality of color samples, and wherein the parameters of the neural network are updated based on the plurality of color samples and the corresponding ground-truth image data.

Some examples of the method, apparatus, non-transitory computer readable medium, and system further include storing the parameters of the neural network in a memory of a second camera device. Some examples further include fine-tuning the parameters of the neural network based on a sensor of the second camera device. This is described in detail with reference to FIG. 13.

Figure 11:
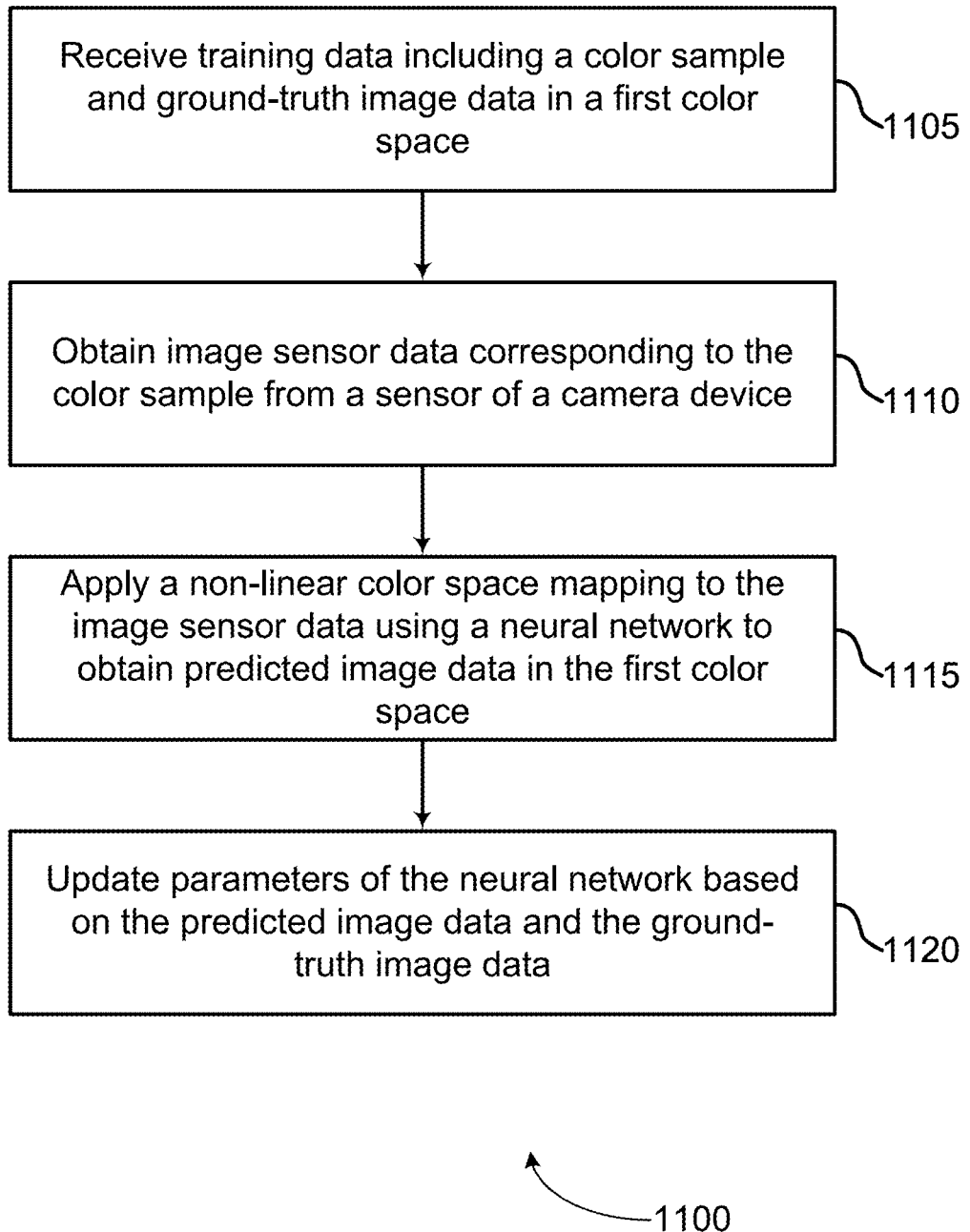
FIG. 11 shows an example of a method for training a neural network according to aspects of the present disclosure.

FIG. 11 shows an example of a method 1100 for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some embodiments, training of the NN is performed by taking a set of spectral measurements which are sparsely distributed in color space. Embodiments of the present disclosure allow training through a relatively small set of spectral measurements; for example, some embodiments obtain sensor data corresponding to one or more color samples.

At operation 1105, the system receives training data including a color sample and ground-truth image data in a first color space. In some cases, the operations of this step refer to, or may be performed by, a training component as described with reference to FIG. 2.

For each of the samples, the MIS signal is recorded (e.g., captured) and the XYZ values are calculated from the known spectrum of the sample. At operation 1110, the system obtains image sensor data corresponding to the color sample from a sensor of a camera device. In some cases, the operations of this step refer to, or may be performed by, an image sensor as described with reference to FIGS. 2 and 4.

At operation 1115, the system applies a non-linear color space mapping to the image sensor data using a neural network to obtain predicted image data in the first color space. In some cases, the operations of this step refer to, or may be performed by, a neural network as described with reference to FIG. 2.

At operation 1120, the system updates parameters of the neural network based on the predicted image data and the ground-truth image data. In some cases, the operations of this step refer to, or may be performed by, a training component as described with reference to FIG. 2. In some embodiments, training of the NN is performed on randomly selected linear combinations of the small sample set measurements. In some embodiments, both the image sensor color space and the target color space are assumed to be additive.

Figure 12:
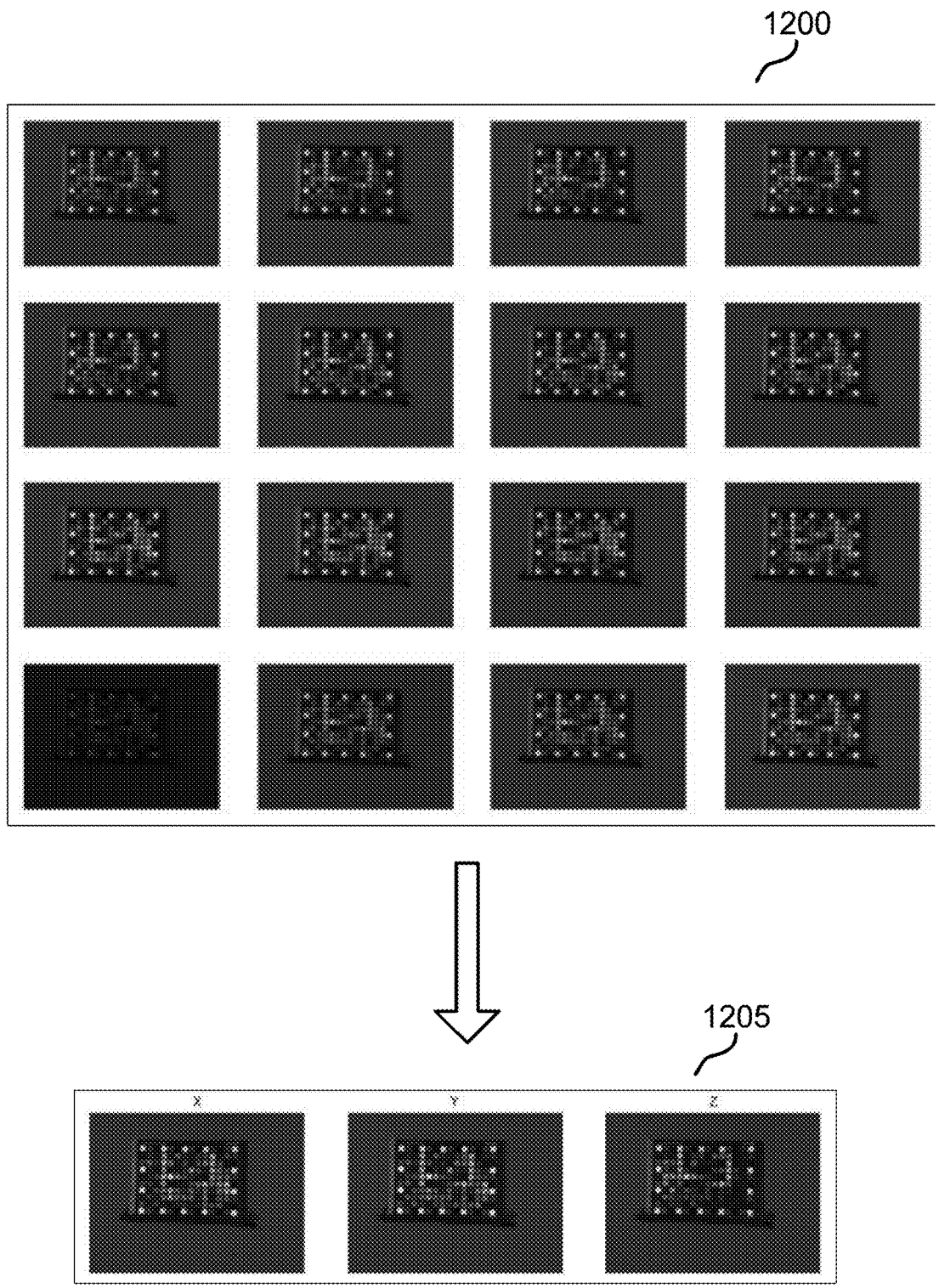
FIG. 12 shows an example of a color reconstruction according to aspects of the present disclosure.

FIG. 12 shows an example of a color reconstruction according to aspects of the present disclosure. The example shown includes MIS input signal 1200 and XYZ reconstruction 1205.

FIG. 12 provides a black and white reproduction of an example capture from a multispectral imaging apparatus that includes 16 channels. MIS input signal 1200 illustrates the reproduction of the signals from each of the 16 unit filters overlayed on a pixel array, each of which corresponds to one of the 16 channels. Reconstruction 1205 illustrates the color reconstruction after the NN according to embodiments has applied a non-linear color mapping to MIS input signal 1200.

Figure 13:
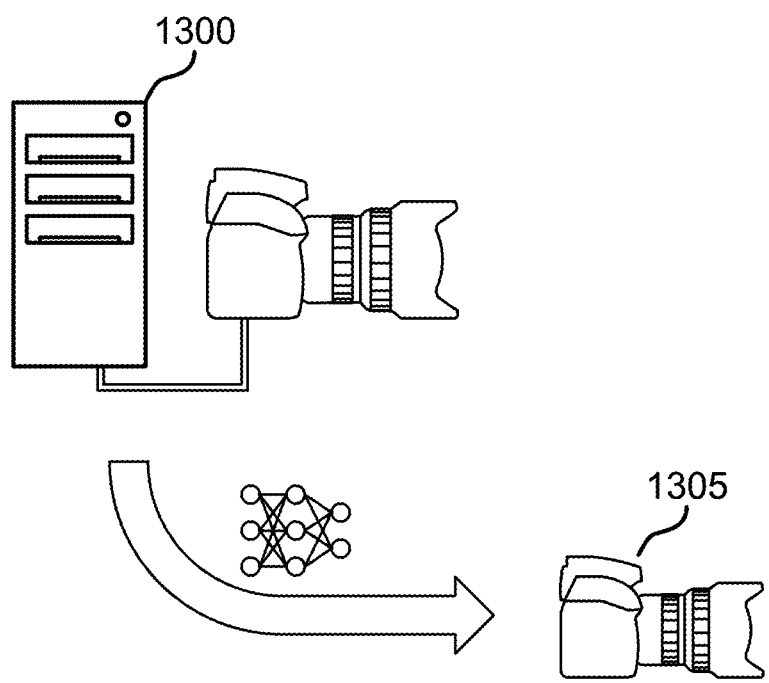
FIG. 13 shows an example of a process for transferring the neural network to a second camera device according to aspects of the present disclosure.

FIG. 13 shows an example of a process for transferring the neural network to a second camera device 1305 according to aspects of the present disclosure. The example shown includes multispectral imaging apparatus 1300 and second camera device 1305. Multispectral imaging apparatus 1300 is an example of, or includes aspects of, the corresponding element described with reference to FIGS. 1 and 2.

The transformation between the MIS output to the target color space should be similar to the transformation from another MIS output of similar multispectral imaging apparatus to the target color space. Therefore, embodiments use an NN trained by one module to initialize the weights for another module. For example, embodiments use the trained NN of multispectral imaging apparatus 1300 to initialize the weights for second camera device 1305. In some cases, only a few image captures are used to tune second camera device 1305. In some cases, only a single image capture is used when the XYZ values are known in advance. Accordingly, embodiments allow for fast and efficient calibration of camera devices, thereby reducing implementation time.

According to some aspects, second camera device 1305 stores the parameters of the neural network in a memory of a second camera device 1305. In some examples, second camera device 1305 fine-tunes the parameters of the neural network based on a sensor of the second camera device 1305.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving image sensor data from an image sensor of a camera device;
applying a non-linear color space mapping to the image sensor data using a neural network to obtain image data, wherein the non-linear color space mapping comprises a non-negative homogeneous function; and
storing the image data in a memory of the camera device.

2. The method of claim 1, wherein:
the image sensor data comprises multispectral image sensor data.

3. The method of claim 1, further comprising:
retrieving the image data from the memory; and
displaying an image based on the image data.

4. The method of claim 1, further comprising:
converting the image data from a first color space to a second color space, wherein the image data is stored using a format based on the second color space.

5. The method of claim 1, further comprising:
applying a color correction to the image sensor data prior to applying the non-linear color space mapping.

6. The method of claim 1, further comprising:
applying a color correction to the image data prior to storing the image data.

7. The method of claim 1, wherein:
the non-linear color space mapping converts the image sensor data to a three-dimensional color space.

8. The method of claim 1, wherein:
the non-linear color space mapping converts the image sensor data to a CIE-XYZ color space.

9. The method of claim 1, further comprising:
applying a demosaicing process to the image sensor data prior to applying the non-linear color space mapping.

10. A method for image processing, comprising:
receiving training data including a color sample and ground-truth image data in a first color space;
obtaining image sensor data corresponding to the color sample from a sensor of a camera device;
applying a non-linear color space mapping to the image sensor data using a neural network to obtain predicted image data in the first color space; and
updating parameters of the neural network based on the predicted image data and the ground-truth image data.

11. The method of claim 10, wherein:
the non-linear mapping comprises a non-negative homogeneous function.

12. The method of claim 10, wherein:
the color sample comprises a plurality of colors selected based on a distribution in the first color space, and wherein the parameters of the neural network are updated based on the plurality of colors.

13. The method of claim 10, wherein:
the training data includes a plurality of color samples and corresponding ground-truth image data for each of the plurality of color samples, and wherein the parameters of the neural network are updated based on the plurality of color samples and the corresponding ground-truth image data.

14. The method of claim 10, further comprising:
storing the parameters of the neural network in a memory of a second camera device; and
fine-tuning the parameters of the neural network based on a sensor of the second camera device.

15. An apparatus for image processing, comprising:
an image sensor configured to capture image sensor data;
a neural network configured to apply a non-linear color space mapping to the image sensor data to obtain image data; and
a memory configured to store the image data,
wherein each node of the neural network comprises a non-negative homogeneous activation function.

16. The apparatus of claim 15, further comprising:
a training component configured to update parameters of the neural network based on a color sample, ground-truth image data corresponding to the color sample, and predicted image data generated by the neural network.

17. The apparatus of claim 15, further comprising:
a display component configured to display an image based on the image data.

18. The apparatus of claim 15, further comprising:
a color correction component configured to apply a color correction to the image sensor data prior to the non-linear color space mapping.

19. The apparatus of claim 15, wherein:
the image sensor is a multispectral image sensor (MIS), and comprises a pixel array and a multispectral filter.

* * * * *